United States Patent [19]
Cornu et al.
[11] Patent Number: 4,532,073
[45] Date of Patent: Jul. 30, 1985

[54] CANDOLUMINESCENT MATERIAL AND ITS PREPARATION

[75] Inventors: Aimé Cornu; Anne-Marie Perroud, both of Meylan, France
[73] Assignee: Commissariat a l'Energie Atomique, Paris, France

[21] Appl. No.: 469,582
[22] Filed: Feb. 25, 1983
[51] Int. Cl.$^3$ .......................... F21H 1/02; F21M 3/00; H01M 2/10
[52] U.S. Cl. .................................... 252/492; 427/159; 431/100
[58] Field of Search .......................... 252/492; 427/159

[56] References Cited

U.S. PATENT DOCUMENTS

| | | | |
|---|---|---|---|
| 365,832 | 7/1887 | Lungren | 252/492 |
| 589,393 | 8/1897 | Moscheles | 252/492 |
| 614,556 | 11/1898 | Killing | 252/492 |

FOREIGN PATENT DOCUMENTS

| | | | |
|---|---|---|---|
| 0082062 | 6/1983 | European Pat. Off. | 431/100 |
| 105172 | 7/1899 | Fed. Rep. of Germany . | |
| 403195 | 5/1909 | France . | |
| 1682 | of 1896 | United Kingdom . | |
| 20740 | of 1898 | United Kingdom | 427/159 |
| 3925 | of 1900 | United Kingdom | 252/492 |

*Primary Examiner*—P. E. Konopka
*Attorney, Agent, or Firm*—James E. Nilles

[57] ABSTRACT

The invention relates to a candoluminescent material, its preparation process and its use as a gas lamp mantle.

This condoluminescent material is constituted by a mixture of finely divided oxides brought into the form of a netting identical to a textile, wherein it comprises 75 to 90 molar % of zirconium oxide $ZrO_2$, 10 to 25 molar % of calcium oxide CaO, 0 to 5% of aluminum oxide and/or magnesium oxide and 0 to 1% in all of one or more oxides chosen from the group including iron oxide, manganese oxide, praseodymium oxide and cerium oxide.

It is prepared by impregnating a combustible textile with a solution of zirconium and calcium salts, optionally containing aluminum, aluminum, iron, manganese, praseodymium and/or cerium salts and then subjecting the impregnated textile to a combustion process in order to eliminate the textile and transform the salts into oxides.

8 Claims, No Drawings

CANDOLUMINESCENT MATERIAL AND ITS PREPARATION

BACKGROUND OF THE INVENTION

The present invention relates to a candoluminescent material, which is in particular usable for gas lamp mantles, as well as to its production process.

Since the time of Auer von Welsbach, gas lamp mantles have been made from a combustible fine cloth impregnated with a mineral which forms, after the initial combustion in the gas flame, a netting in the solid state which, in the flame, gives an intense candoluminescence phenomenon. The solid netting rapidly forms as from the initial ignition and acquires its difinitive shape and a solid texture resisting mechanical and thermal shocks. To obtain this resistance, it is preferable for the solid netting to have a fluorine-type cubic crystalline structure. Moreover, for the candoluminescent material to have a high level of brightness in the visible range, it must only have limited emission in the infrared, which makes it possible to reach a high temperature in the substantially colourless flame of the gas.

At present the mantles are constituted by a cloth net impregnated with a mixture of salts, forming after the initial combustion a fine and divided cloth, of thorium oxide containing a little cerium oxide or other oxides, e.g. an oxide containing 99.2 molar % of $ThO_2$ and 0.8 molar % of $CeO_2$.

However, the use and production of mantles based on thorium oxide have a certain number of disadvantages. Thus, thorium is a naturally radioactive, alpha-emitting element having a half-life of $1.4.10^{10}$ years and by decay gives various radioactive isotopes, which are alpha, beta or gamma emitters with a short life, including a radioactive gas, thoron 220, which leads to lead 208. Thus, one ton of natural thorium represents about one curie of $^{232}Th$ and one curie of $^{228}Th$. However, the thorium quanities used in the production of mantles is by no means negligible in view of the fact that, according to World statistics, the production of candoluminescent mantles is roughly 300 million yearly. Thus, at a rate of 0.3 g of thorium per mantle, the thorium quantity involved is 100 tons yearly, which leads to a dissemination of thorium.

Thus, when the mantles are broken, the impalpable thorium oxide powder is disseminated or scattered in the environment. Moreover, it is usually necessary to maintain a stock of of several dozen kilograms of thorium, which produces radioactive thoron, so that certain precautions should be taken in connection with the handling, storage and transportation of these mantles. Finally, in view of the fact that thorium can be used as a nuclear fuel in fast neutron reactors it would be preferable to reserve it for this use and use other materials for producing gas lamp mantles.

With this aim, various products have been proposed, such as alumina based materials doped with other oxides, but the results obtained with them have not been satisfactory.

BRIEF SUMMARY OF THE INVENTION

The present invention relates to a candoluminescent material usable as a gas lamp mantle having the advantage of containing no thorium, while having satisfactory properties.

The present invention therefore relates to a candoluminescent material constituted by a mixture of finely divided oxides in the form of a netting identical to a textile, wherein it comprises 75 to 90 molar % of zirconium oxide $ZrO_2$, 10 to 25 molar % of calcium oxide CaO, 0 to 5% of aluminum oxide and/or magnesium oxide and 0 to 1% in all of one or more oxides chosen from the group including iron oxide, manganese oxide, praseodymium oxide and cerium oxide.

As a result of this composition, this mixture of oxides has indispensable properties for lighting purposes, i.e. a high candoluminescence and a good mechanical strength in the flame and after the extinction thereof.

Thus, the aforementioned oxide mixtures in the indicated molar proportions have only a slight adsorbance in the infrared when heated in the divided state in a flame and in the latter produce an intense white candoluminescence, whose shade can be slightly modified by varying the content of iron oxide, praseodymium oxide, manganese oxide and/or cerium oxide.

Moreover, these oxide mixtures have a good stability to mechanical and thermal shocks because they have a fluorine-type cubic crystalline structure, which alone permits a good stability due to its isotropic expansion. In the same way, the chemical stability of the mixture of crystallized oxides in an oxidizing flame is very good because it is insensitive to carbonation in cubic crystalline form.

Thus, the candoluminescent material according to the invention has properties equivalent to those of thorium oxide-based materials.

According to a first embodiment of the invention, the candoluminescent material only consists of a mixture of zirconium oxide and calcium oxide and specifically 80 to 90 molar % of zirconium oxide an 10 to 20 molar % of calcium oxide.

According to a second embodiment of the invention, the candoluminescent material comprises a mixture of zirconium oxide, calcium oxide, and aluminium and/or magnesium oxide, namely 80 to 90 molar % of zirconium oxide, 5 to 20 molar % of calcium oxide and 1 to 5 molar % of magnesium and/or aluminium oxide.

Thus, the presence of alumina makes it possible to improve the brightness of the material, while retaining its good mechanical properties. An example of a composition of this type contains 80 molar % $ZrO_2$, 16 molar % CaO and 4 molar % $Al_2O_3$.

According to a third embodiment of the invention, the mixture consists of zirconium oxide $ZrO_2$, calcium oxide CaO, aluminium and/or magnesium oxide and a small addition of one or more oxides chosen from the group including iron oxide, manganese oxide, praseodymium oxide and cerium oxide.

In this case, the mixture of oxides consists of 75 to 90 molar % of zirconium oxide, 5 to 20 molar % of calcium oxide, 1 to 5 molar % of alumina and/or magnesia and 0.01 to 1% in all of one or more oxides chosen from the group including iron oxide, manganese oxide, praseodymium oxide and cerium oxide. An example of the composition of this type is 79 molar % $SrO_2$, 16 molar % CaO, 4 molar % $Al_2O_3$ and 1 molar % $Fe_2O_3$.

In this case the addition of iron oxide or other oxides makes it possible to improve and adapt the colour of the lighting.

Using products having an industrial quality ($ZrO_2$, CaO, $Al_2O_3$) an attractive white light is obtained without it being necessary to add other compounds. However, in the case of higher purity products, other compounds may be added to obtain a pleasant light.

The invention also relates to a process for preparing a candoluminescent material having the aforementioned properties.

This process consists of impregnating a combustible textile with a solution of calcium and zirconium salts, optionally including an aluminium and/or magnesium salt, and one or more salts chosen from the group including iron, manganese, praseodymium and cerium salts, the concentration of the salts in the impregnation solution being such that it corresponds to obtaining a mixture of oxides having the following molar composition: 75 to 90% $ZrO_2$, 10 to 25% CaO, 0 to 5% $Al_2O_3$ and/or MgO, and 0 to 1% in all of iron, manganese, praseodymium and/or cerium oxides and then exposing the thus impregnated textile to combustion in the presence of oxygen to eliminate the textile and convert the salts into oxides distributed in the form of a netting substantially corresponding to the original textile.

According to a first embodiment of this process, the impregnation solution only comprises zirconium and calcium salts and the zirconium and calcium salt contents of the solution are such that they correspond to obtaining a mixture of oxides with the following molar composition: 80 to 90% $ZrO_2$ and 10 to 20% CaO.

In this case, the content $n_1$ of zirconium atoms and the content $n_2$ of calcium atoms in the solution are such that the ratio $$\frac{n_1}{n_1 + n_2}$$

is 9:10 to 9:10 and the ratio $$\frac{n_2}{n_1 + n_2}$$

is 1:10 to 2:10.

According to a second embodiment of the process, the impregnation solution comprises zirconium, calcium and aluminium and/or magnesium salts and the respective contents of zirconium, calcium, aluminium and magnesium salts in the solution are such that they correspond to obtaining a mixture of oxides having the following molar composition: 80 to 90% $ZrO_2$, 5 to 20% CaO and 1 to 5% $Al_2O_3$ and/or MgO.

In this case the contents $n_1$ of zirconium atoms, $n_2$ of calcium atoms and $n_3$ of aluminium atoms in the solutions are such that the ratio $$\frac{n_1}{n_1 + n_2 + n_3}$$

is 8:10 to 9:10, the ratio $$\frac{n_2}{n_1 + n_2 + n_3}$$

is 5:100 to 2:10 and the ratio $$\frac{n_3}{n_1 + n_2 + n_3}$$

is 1:100 to 5:100. The addition of an aluminium salt has the secondary effect of making the impregnated textile more supple, no doubt because the salts are very hygroscopic.

According to a third embodiment of the process according to the invention, the solution comprises zirconium, calcium, aluminium and/or magnesium salts and one or more salts chosen from the group including iron, manganese, praseodymium and cerium salts and the respective contents of zirconium, calcium, aluminium, magnesium, iron, manganese, praseodymium and/or cerium salts in the solution are such that they correspond to obtaining a mixture of oxides with the following molar composition: 75 to 90% $ZrO_2$, 5 to 20% CaO, 1 to 5% $Al_2O_3$ and/or MgO and 0.01 to 1% in all of iron, praseodymium, manganese and/or cerium oxides.

When the candoluminescent material is intended for producing a gas lamp mantle, the combustion of the textile takes place in the flame of the gas lamp during the first use of the mantle.

During this combustion, the anions of the salts are progressively eliminated and the metals are organized int the state of oxides in accordance with a fluorine-type cubic crystalline texture, while approximatley reproducing the shape assumed by the fibres of the cloth towards the end of their combustion.

The combustible textile used can be based on cotton, rayon, acetate or other natural or artificial fibres, such as those generally used in the production of candoluminescent mantles.

The textile can be in the form of a cloth, gauze, tulle, voile, etc. The best results are obtained with very well aerated cloths, because in general textiles burn with significant shrinkage. Thus, a well aerated gauze-like cloth is more suitable, because the installation of the mineral structure takes place more easily and the mantle is stronger. Moreover, it is preferable for the weaving threads of the cloth to be constituted by groups of extremely fine threads rather than large fibres. Thus, after converting into oxide filaments, the extremely fine threads are not such good thermal conductors and lose less energy by conduction.

The solutions used for impregnation purposes can be aqueous or organic solutions, e.g. alcoholic solutions. In the same way, the salts used can be salts obtained from a mineral or organic acid, or from alkoxides. Preference is given to the use of aqueous solutions because it has been found that the mechanical behaviour of the mantles obtained is better in this case. This is doubtless due to the fact that a better impregnation of the cellulose cloth is obtained with these solutions because cellulose cloths do not have a great affinity for organic products. Thus, a good impregnation homogeneity is not obtained and the mechanical behaviour of the resulting mantle after combustion of the textile is less satisfactory.

In the same way, it is preferable to use as the zirconium, calcium, aluminium, magnesium, iron, praseodymium, manganese and cerium salts, salts of mineral acids in order to obtain a good impregnation homogeneity and an easy conversion into oxides.

Although different mineral acid salts can be used, preference is given to the use of nitrates, because they have the advantage of readily decomposing into oxides and of being suitable for the preparation of solutions having adequate salt concentrations.

Thus, although cellulose-based textiles fix an important quantity of solution, it is necessary to have a high salt concentration in order that, after combustion of the textile, the sleeve has an adequate residual oxide quantity and thus constitutes a strong structure. Finally, it is preferable to use freshly prepared solutions for impregnation purposes, because solutions rapidly evolve and at the end of a few weeks it is found that they are both hydrolyzed and carbonated, which modifies the impregnation and combustion conditions of the sleeve.

According to the invention, it is possible to add various adjuvants to the solution, particularly for improving the wettability, the suppleness or keeping characteristics of the cloth and in the same way in which this is generally carried out for the production of thorium oxide mantles.

When the process according to the invention is used for producing gas lamp mantles, the impregnated mantles undergo drying and are then stored in the dry state, in the same way as for thorium oxide-based mantles.

DESCRIPTION OF THE EMBODIMENTS

Other features and advantages of the invention will be gathered from the study of the following embodiments, which are purely illustrative and non-limitative.

These embodiments relate to the production of candoluminescent mantles for gas lamps, such as lamps used by campers and sold by the Societe d'Application des Gaz.

In these embodiments, the combustible textile material used is mosquito netting in the form of 5 cm high mantles. For this purpose small mantles have been made from mosquito netting, which have an asbestos filament at each end permitting their fixing to the lamp. These textile mantles then undergo impregnation with various solutions and impregnation is carried out by immersing the textile in the solution, then draining it by means of a small paint roller on a glazed plate and allowing it to dry on the same plate at ambient temperature for 1 hour.

In most cases in connection with the preparation of the different salt solutions, molar solutions of thorium nitrate, zirconium nitrate, calcium nitrate, magnesium nitrate, aluminium nitrate and iron nitrate were used, i.e. aqueous solutions having in each case for 1 kg of solution:

552 g of $Th(NO_3)_4,4H_2O$
429 g of $Zr(NO_3)_4,5H_2O$
236 g of $Ca(NO_3)_2,4H_2O$
256 g of $Mg(NO_3)_2,6H_2O$
375 g of $Al(NO_3)_3,9H_2O$
404 g of $Fe(NO_3)_3,9H_2O$

The other addition elements (FE—Mn—Pr—Ce) are also in the form of nitrates.

Thus, the use of such solutions makes it possible to easily obtain by weighing the desired salt contents for the impregnation solution, because it is merely necessary to mix these solutions in the weight proportions corresponding to the molar proportions of oxides which it is wished to obtain.

For comparison purposes, use was also made of a magnesium nitrate solution for producing magnesia-doped zirconium oxide-based mantles, as well as a thorium nitrate solution for producing thorium oxide-based mantles.

In addition, in two examples, use was made of a zirconium butylate solution, which was mixed with an alcoholic solution of calcium nitrate in the presence or absence of a plasticizer.

The composition of the different solutions used in the examples is given in the attached table.

After placing the impregnated, dried textile on the lamp support, it undergoes an initial combustion in the flame of the lamp in order to transform the impregnated cloth into a mixed oxide netting having a fluorine-type cubic crystalline texture.

The properties of the resulting mantle were then checked with respect to the brightness of the candoluminescent material and the mechanical behaviour of the mantle.

To determine the brightness of the candoluminescent material, a disappearing filament optical pyrometer was used and pointing was effected on the mantle surface to determine its luminance temperature by observing it through a piece of ground glass, like that conventionally used in campers' lamps. Thus, the luminance temperature of the mantle is determined with a divergence of approximately 100° C.

The results obtained are given in the attached table, where the values are mean values of 5 measurements performed in each example for each type of mantle. After combustion, the average weight of the mantles is approximately 2 g and that of the ash 0.4 to 0.5 g.

The table results show that the best mantle is obtained on the basis of a mixture having 80 molar % $ZrO_2$, 16 molar % CaO and 4 molar % $Al_2O_3$, its brightness or luminance temperature being comparable with that of thorium oxide mantles. The presence of approximately 1% of ferric oxide, which had been envisaged for the purpose of improving the colour of the lighting, leads to an ignition delay and turns the flame very pink. It is also assumed that the high lime quantity (16%) is sufficient for colouring the flame, which is somewhat too white on the basis of alumina-doped zirconia. Moreover, the impurities normally present in industrial materials doubtless contain iron for slightly shading the flame. With regards to the mechanical behaviour of the mantles, i.e. their resistance to the initial combustion and to several ignitions (approximately 10), the results obtained are also given in the following table.

On the basis of these results, it can be seen that from the mechanical stand point, lime is the best stabilizing agent for cubic zirconia, particularly when compared with magnesia, because mantles containing zirconia and magnesia are destroyed before the measurement and zirconia-based mantles which also contain lime and magnesia are unable to resist a number of ignitions (cf. Examples 6 to 8). Thus, magnesia-based oxides give a netting which is rapidly destroyed during repeated ignitions.

However, lime is inferior to magnesia from the brightness standpoint, because it lowers the zirconia brightness temperature, as can be seen from comparing the results obtained in Examples 2, 3 and 6. However, this deficiency can be compensated by adding alumina to the mixture.

Thus, the most satisfactory mantle contains 80 molar % $ZrO_2$, 16 molar % CaO and 4 molar % $Al_2O_3$.

For comparison purposes, the table gives the results obtained with a commercially available mantle. It can be seen that in this case the brightness temperature is high and the mechanical behaviour good.

TABLE

| Example | Impregnation solution corresponding to obtaining a material of molar composition | Relative colour temperature | Comments |
|---|---|---|---|
| 1 | 100% $ThO_2$ | 1280 | good behaviour |
| 2 | 100% $ZrO_2$ | 1360 | mediocre behaviour |
| 3 | 84% $ZrO_2$-16% CaO | 1230 | good behaviour |
| 4 | 80% $ZrO_2$-16% CaO- | 1320 | good |

TABLE-continued

| Example | Impregnation solution corresponding to obtaining a material of molar composition | Relative colour temperature | Comments |
|---|---|---|---|
| | 4% $Al_2O_3$ | | behaviour |
| 5 | 79% $ZrO_2$-16% CaO-1% $Fe_2O_3$ | 1280 | slow ignition, pink light |
| 6 | 87.5% $ZrO_2$-12.5% MgO | 1380 | average behaviour |
| 7 | 83.3% $ZrO_2$-12.5% MgO-4.2% $Al_2O_3$ | — | destroyed before measurement |
| 8 | 78.6% $ZrO_2$-16 CaO 5.4 MgO | 1280 | does not resist several ignitions |
| 9 | 84% $ZrO_2$-16 CaO | 1230 | moderate behaviour |
| 10 | 84% $ZrO_2$-16 CaO with plasticizer | — | tears before measurement |
| | mantle marketed by Societe d'application des Gaz | 1300 | good behaviour |

What is claimed is:

1. A candoluminescent material comprising a mixture of finely divided oxides in the form of a netting identical to a textile, consisting essentially of 80 to 90 molar % of $ZrO_2$, 5 to 20 molar % of CaO and 1 to 5 molar % of $Al_2O_3$.

2. The candoluminescent material according to claim 1, which further contains 1 to 5 molar % of MgO.

3. The candoluminescent material according to claim 2, which further contains 0.01 to 1 molar % of one or more oxides selected from the group consisting of iron, praseodymium, manganese and cerium oxides.

4. The candoluminescent material according to claim 1, consisting essentially of 80 molar % $ZrO_2$, 16 molar % of CaO and 4 molar % of $Al_2O_3$.

5. A process for the preparation of a candoluminescent material, consisting of impregnating a combustible textile with a solution of calcium, zirconium and aluminum salts, the concentration of the salts in the impregnation solution being such that a mixture of oxides having the following molar composition: 80 to 90 molar % of $ZrO_2$, 5 to 20 molar % of CaO, and 1 to 5 molar % of $Al_2O_3$ is obtained upon combustion, and then exposing the thus impregnated textile to combustion in the presence of oxygen to eliminate the textile and convert the salts into oxides which are distributed in a form of a netting substantially corresponding to the original textile.

6. The process for the preparation of the candoluminescent material according to claim 5, wherein said impregnation solution further contains magnesium salts in a concentration such that the mixture of oxides formed upon combustion contains 1 to 5 molar % of MgO.

7. The process for the preparation of the condoluminescent material according to claim 6, wherein said impregnation solution further contains one or more salts selected from the group consisting of iron, manganese, praseodymium cerium salts, such that the mixtutre of oxides obtained upon combustion contains 0.01 to 1 molar % of iron, manganese, praseodymium or cerium oxides or a mixture thereof.

8. The process for the preparation of the candoluminescent material according to claim 5, wherein said impregnation solution contains zirconium, calcium and aluminum, the concentration of the salts in the impregnation solution being such that the mixture of oxides formed upon combustion contains 80 molar % of $ZrO_2$, 16 molar % of CaO and 4 molar % of $Al_2O_3$.

* * * * *